United States Patent [19]

Dieckermann

[11] 4,106,602

[45] Aug. 15, 1978

[54] FREE-WHEEL CLUTCH

[75] Inventor: Friedhelm Dieckermann, Plankstadt, Fed. Rep. of Germany

[73] Assignee: Borg-Warner-Stieber GmbH, Heidelberg, Fed. Rep. of Germany

[21] Appl. No.: 763,193

[22] Filed: Jan. 27, 1977

[30] Foreign Application Priority Data

Feb. 6, 1976 [DE] Fed. Rep. of Germany ....... 2604567

[51] Int. Cl.² ............................................ F16D 15/00
[52] U.S. Cl. .................................................. 192/45
[58] Field of Search ...................... 192/41 A, 45, 45.1

[56] References Cited

U.S. PATENT DOCUMENTS

| 2,069,558 | 2/1937 | Rauen et al. | 192/45 |
| 2,973,847 | 3/1961 | Stockton | 192/45 |
| 3,260,333 | 7/1966 | Benson et al. | 192/45 |
| 3,543,894 | 12/1970 | Giese | 192/45.1 |
| 3,917,036 | 11/1975 | Johnson et al. | 192/45 |

*Primary Examiner*—Granville Y. Custer, Jr.
*Attorney, Agent, or Firm*—Herman E. Smith

[57] ABSTRACT

A free-wheel clutch includes segmental cage members spaced annularly between inner and outer races of the clutch members, each segmental cage member serves as a retainer for a gripper and its associated energizing spring and in addition serves as bearing means for maintaining concentricity between the inner and outer races, various examples are shown and described.

15 Claims, 16 Drawing Figures

FREE-WHEEL CLUTCH

BACKGROUND OF THE INVENTION

The present invention relates to free-wheel clutches having inner and outer members with gripper members arranged between the inner and outer members which are biased for engagement therewith by spring means.

It is well known that free-wheel clutches frequently require aids for maintaining concentricity between the inner and outer members thereof. In the prior art it is known to provide anti-friction bearings or annular disc bearings between the inner and outer clutch members for maintaining concentricity. Particularly in the case of large diameter clutches, the use of annular disc bearings results in a disadvantage in that a considerable amount of bearing material is wasted during the manufacture of the bearing.

In order to reduce the cost of centering aids, it is known in the prior art to insert molded bearing blocks in the cage in positions similar to those occupied by the gripper elements. The bearing blocks are secured by the cage and support the inner and outer races of the clutch members. The use of bearing blocks overcomes the disadvantage of wasting bearing material. However, the use of bearing blocks results in a more costly cage and the bearing block occupys positions which could be occupied by additional gripper elements.

The present invention is based on providing a free-wheel clutch which is economical in the use of bearing material and in which a large member of gripper elements can be employed.

SUMMARY OF THE INVENTION

In accordance with the present invention, the gripping elements and springs are mounted in separate segmental cage members several of which are spaced circumferentially within the free-wheel clutch. The segmental cage members may abut one another or be spaced apart, each segmental cage member being capable of receiving one or more gripping elements and its associated spring. A group of such segmental cage members are used instead of unitary cages. The segmental cage members provide bearing means for the free-wheel clutch which assures concentricity of its members. In addition, the segmental cage members can be manufactured from strip material of a width approximately the width of the clutch races. Only a small amount of material is wasted in stamping the openings for the gripping elements.

In the present invention, "gripping elements" include the well known cylindrical grip rollers as well as non-cylindrical elements known as sprags. Thus the present invention includes free-wheel clutches in which one ring includes a cylindrical surface and the other ring includes a surface having beveled clamping surfaces with a roller member between them, and also includes free-wheel clutches in which each of the rings includes a cylindrical race surface with sprag type grippers arranged between the races.

In a very simple form of the invention, the segmental cage member includes a base constituting a slideable bearing surface engaging one of the clutch members, at least one support portion engaging the other clutch member, and one or more openings for the gripper elements. In order to prevent displacement of the segmental cage members circumferentially of the clutch, particularly where the cage members are spaced apart, the segmental cage members are secured to one of the clutch race members. The outer race ring is preferred for securing the segmental cage members against displacement. In a free-wheel clutch of the type using grip rollers, the slideable bearing surface of the segmental cage is engaged with the clutch member having the cylindrical race, while the support portion engages the member having the race in which the beveled wedging surfaces are defined. The segmental cage members are secured against displacement with respect to the race surface which includes the beveled clamping or wedging surface.

In accordance with a preferred embodiment of the invention, the support portion or portions of the segmental cage member are connected to a profiled portion thereof spaced opposite to the base portion, the profiled portion having a shape mating with the race surface which includes the wedging surface, and the profiled portion including openings corresponding to the openings in the base portion. This preferred embodiment relates to the type of free-wheel clutch using grip rollers. In the type of free-wheel clutch using sprags, the support portion or portions are connected to an outer portion which is a slideable bearing surface. The outer portion has openings corresponding to the openings in the base portion. In these preferred embodiments, the race rings can be manufactured as before and the separate segmental cage members inserted between the races. In the roller type clutch, the segmental cage members are inserted at the wedging surfaces and are thereby secured against circumferential displacement. In sprag type clutches, the segmental cage portions are permitted to migrate in the circumferential direction.

In order to improve the bearing properties of the segmental cage members, selected surfaces thereof which engage a cylindrical race, are provided with special bearing material. In this case, the segmental cage member itself is formed of relatively inexpensive sheet metal. Only the selected bearing surface or surfaces are covered with special bearing material. Aluminum, brass and synthetic material can be used as a special bearing material. However, it is also possible to provide special bearing characteristics by suitably treating the selected surfaces thereof as by nitration of the surface or also by spraying polytetraflourethylene thereon, for example. Good bearing characteristics are also obtained where the segmental cage members are completely formed of a synthetic material.

The segmental cage members are provided with guides for the gripping elements and springs. This prevents oscillation of the gripper elements and avoids displacement of the springs. The guide for the gripper elements can be formed from a portion of the profiled portion. Guidance for the spring can be obtained from openings and/or from the gripper guide where pleated springs are used. These pleated springs are constructed dimensionally in such a fashion that if they are suitably arranged in the segmental cage member, they are guided at their sides by the edges of the openings. The springs are retained and supported by a back wall of the segmental cage member. In a roller clutch having a pleated spring which deflects radially, it is advantageous to provide a curvature on the end of the spring engaging the roller which is larger than the curvature of the roller. Sheet material strips or rectangles may be used as the material for manufacturing the segmental cage members.

In the case of sprag type clutches, it is advantageous if a segmental cage member is connected to one of the race rings by means of an interlocking connection with a retaining ring. Retaining rings of this type are known in the prior art. They are connected to the cage and grip the race with their arches or ends.

The present invention is described in greater detail below in terms of several embodiments.

DESCRIPTION OF THE PREFERRED EMBODIMENTS

Figure 1:
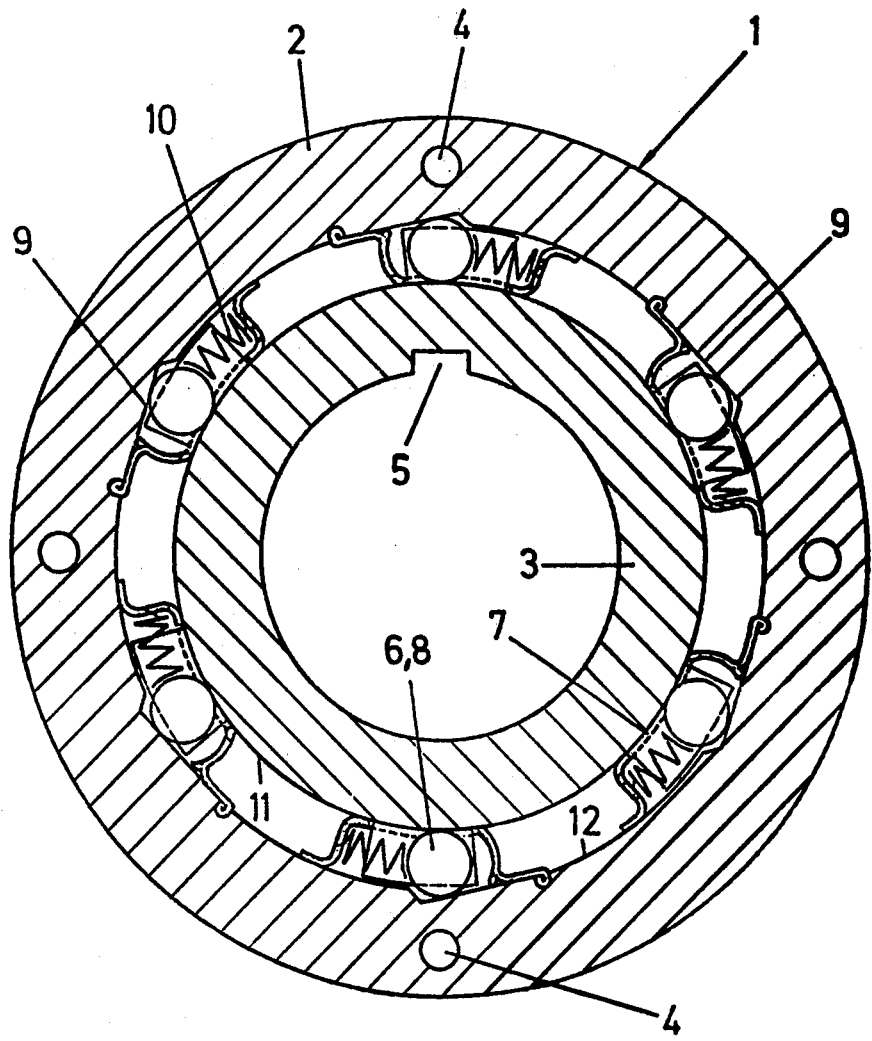
FIG. 1 shows, in schematic fashion, a free-wheel clutch with segmental cage members in cross section.

In FIG. 1 a free-wheel clutch 1 is shown in cross section, having an outer member 2 and an inner member 3. The outer member 2 is connected to a corresponding machine part by means of screws not shown in the drawing and which are inserted in the openings 4. The inner clutch member 3 is connected to a shaft by a key to be inserted in the key way 5. Gripping elements 6 are located between clutch members 2 and 3 and are retained in specially positioned segmental cage members 7. The gripping elements 6 are grip rollers 8 and the outer clutch member 2 has corresponding wedging surfaces 9 for the grip rollers 8. The grip rollers 8 are biased by the spring 10 in direction for engaging the races.

Figure 2:
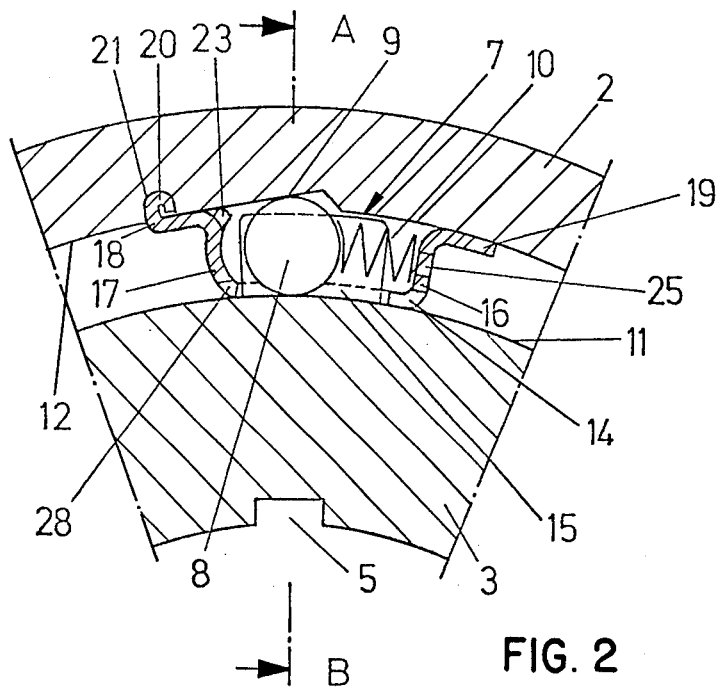
FIG. 2 shows a fragmentary portion of FIG. 1 to enlarged scale.

A fragment of the clutch of FIG. 1 is shown in FIG. 2. The inner clutch member 3 constitutes the part of the clutch having a cylindrical race surface and is designated as a race ring. The outer clutch member 2 forms a second race ring which includes beveled wedging or clamping surfaces 9 on its inner race surface. The race ring has cylindrical segments 12 between the spaced beveled clamping surface segments 9. The segmental cage member 7 is inserted in the clutch 1 in the area of the beveled clamping surface 9. Each segmental cage member 7 surrounds a grip roller 8 and a spring 10. The segmental cage member 7 itself includes a base portion 14 providing a slideable bearing surface with an opening 15, and support portions 16, 17 which engage cylindrical segments 12 in race ring 2. The segmental cage members 7 thus provide a bearing and provide for concentricity between the two race rings 2 and 3. The grip roller 8, in accordance with relative rotation of the clutch members 2 and 3, provides for coupling or release of the clutch members in a conventional manner.

Support portions 16 and 17 of segmental cage member 7 are bent at their ends in order to provide better support on outer member 2. The end 18 has a rolled portion 20 which is engaged in a groove 21 formed in ring member 2. The segmental cage member 7 is thus prevented from becoming displaced. So that the grip roller 8 is held in the cage segment 7 prior to installation between the clutch members, only the middle part of support portion 17 is bent at its end. In the embodiment shown in FIG. 2, the outer edges 22, 23 of support portion 17 are shortened and bent toward the grip roller 8. Only the middle part 24 of end 18 is used for stabilizing or securing the cage segment 7 in clutch member 2. The rolled portion 20 engageable with groove 21 is formed at the bent end 18 in order to provide good support. As shown in FIG. 2, it is especially advantageous if the inner curvature of support portion 17 is coordinated with the curvature of the grip roller 8. The grip roller 8 rests in the curvature of support portion 17 under compression of spring 10 prior to installation of the cage segment 7 in clutch 1. The other support portion 16 of cage segment 7 has an opening 25 in order to snap in the spring 10 in normal fashion. A blade can also be provided which engages in a corresponding opening of the spring.

The cage segment 7 also has lateral guides 26, 27 in order to guide the grip roller 8, and also includes a window 28 in the bridge between the base 14 and support 17 so that the oil film present on cylindrical surface 11 can pass through. This oil film causes a damping effect of the oscillations of the rollers which may occur in certain installations. If desired, a window of this type can also be arranged on the bridge between base portion 14 and support portion 16.

Figure 3:
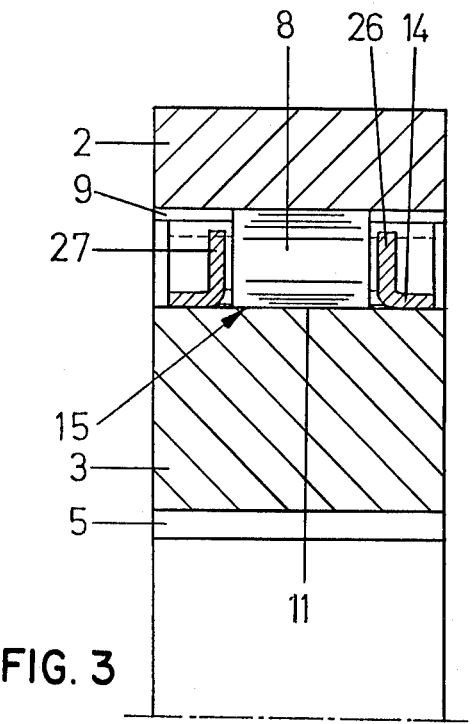
FIG. 3 shows a section view taken along the line A–B of FIG. 2.

FIG. 3 shows the segmental cage member 7 in section taken along the line A–B of FIG. 2. The lateral guides 26, 26 for roller 8 are easily recognized here. The roller 8 is located in gripping position between cylindrical race surface 11 and wedging area 9.

Figure 4:
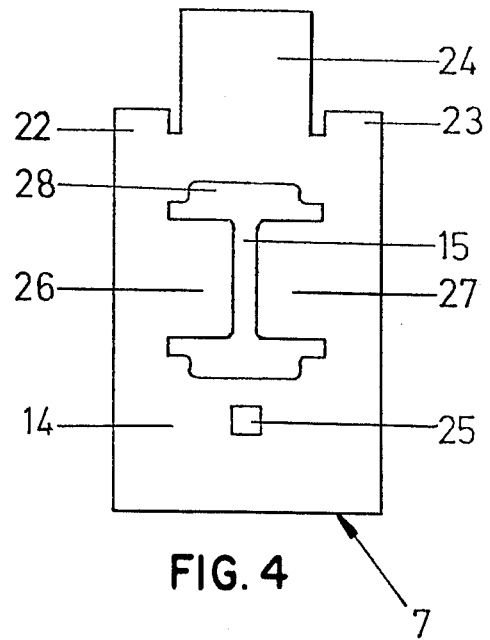
FIG. 4 shows a stamped blank from which the segmental cage member of FIG. 2 is formed.

In FIG. 4, segmental cage member 7 is shown flattened as it appears following stamping from a sheet metal piece of stock and before bending into three dimensional shape. In order to form the finished cage segment, the two ends of the sheet metal stamping are bent at a sharp angle, the middle portion 24 is provided with a rolled portion at its end, and the edges 22 and 23 are respectively bent in order to receive the roller 8. In the same manner, the guides 26 and 27 are bent up. Parts of base portion 14 remain adjacent the guides, while the opening 15 occurs between the guides through which the grip roller 8 extends for contact with cylindrical surface 11.

Figure 5:
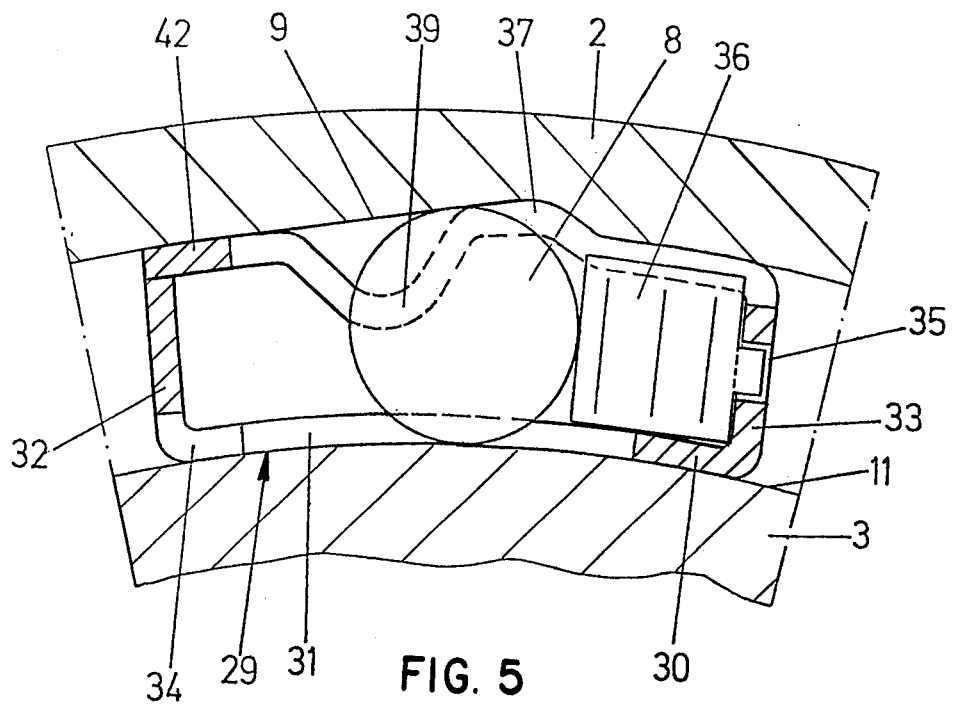
FIG. 5 is similar to FIG. 2, but shows an alternate form of segmental cage member.
Figure 6:
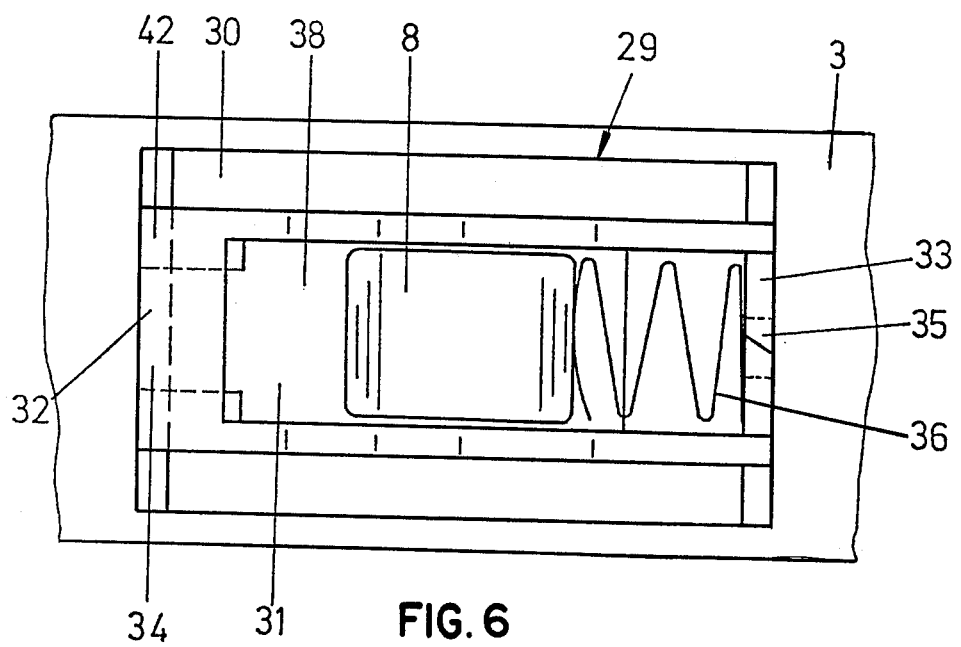
FIG. 6 is a top view of the segmental cage member shown in FIG. 5.
Figure 7:
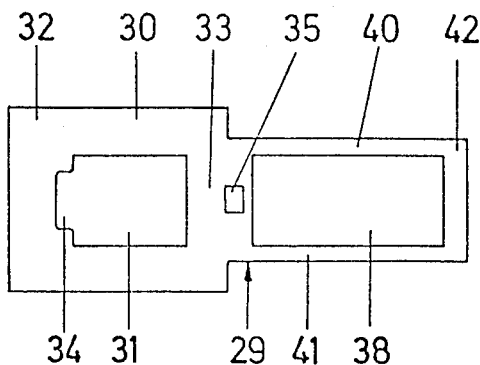
FIG. 7 shows a stamped blank from which the segmental cage member of FIG. 5 is formed.

Another embodiment of segmental cage member 29 is shown in FIGS. 5, 6 and 7. The base portion 30 of segmental cage member 29 corresponds substantially with base portion 14 of the segmental cage member shown in FIGS. 1 through 4. The base portion is matched to the curvature of cylindrical race surface 11 and has an opening 31 extending therethrough for grip roller 8. In addition, segmental cage member 29 has two support portions 32, 33 one support portion 32 including a window 34 for the oil film and the other support portion 33 including an opening 35 for engagement of spring 36. Segmental cage member 29 differs from cage member 7 in that it does not include bent ends 18, 19 but has a profiled portion 37 spaced opposite base portion 30 which is matched or coordinated for mating engagement with the profile of race ring 2 in the region of a wedging surface, that is, the shape of profiled portion 37 follows the shape of the beveled wedging surface 9. In addition, the profiled portion 37 includes an opening 38 which corresponds to the opening 31 in base portion 30. The profiled portion 37 also has an indented recesss 39 facing inwardly which has inner surfaces providing guides for a grip roller 8. The profiled portion 37 is unitary with other portions of the cage segment 29 which are connected by supporting portion 33. The spring 36 is a pleated spring which is turned 90° in relation to the pleated spring 10 in the first example. In FIG. 7, the portions of the cage segment 29 are shown flattened in the form of a blank. The profiled portion 37 is similar in construction to base portion 30. The two lateral portions 40, 41 are suitably shaped to engage race ring 2 and for guiding grip roller 8. The end 42 rests on support 32.

Figure 8:
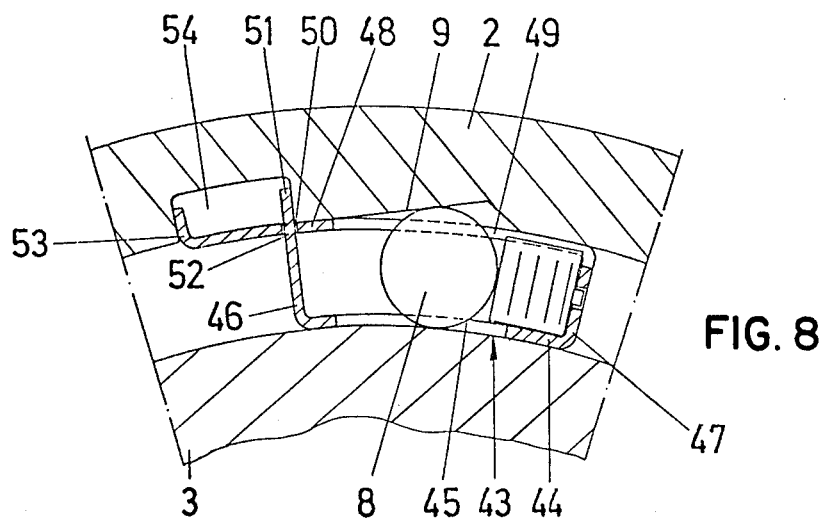
FIG. 8 shows a further embodiment of segmental cage member in cross section.

The segmental cage member 43 shown in FIG. 8 has a base runner portion 44 with an opening 45 and support portions 46, 47 which are engaged with outer race ring 2 through outer part 48. The outer part 48 has an opening 49 for grip roller 8. In addition, outer part 48 includes a slot 50 for tongue part 51 of support portion 46. Flanges 52 of support portion 46 bear against outer part 48. A projecting end 53 and tongue 51 engage in a groove 54 of race ring 2 and serve to stabilize the position of segmental cage member 43 with respect to the race ring. The wedging surface 9 is not used for securing the segmental cage member 43 in the embodiment shown in FIG. 8.

Figure 9:
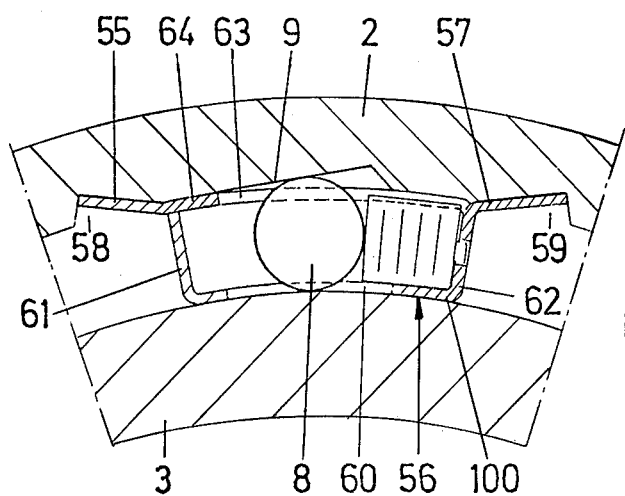
FIG. 9 shows a still further embodiment of a segmental cage member having a pair of supporting ends in cross section.

The wedging surface is not used for securing the segmental cage member in the embodiment of FIG. 9. Bent ends 55, 57 are inserted in grooves 58, 59 of ring member 2. Base portion 100 includes opening 60, and supporting portions 61 and 62 as well as opening 63 of outer part 64 correspond substantially with embodiments hitherto described.

Figure 10:
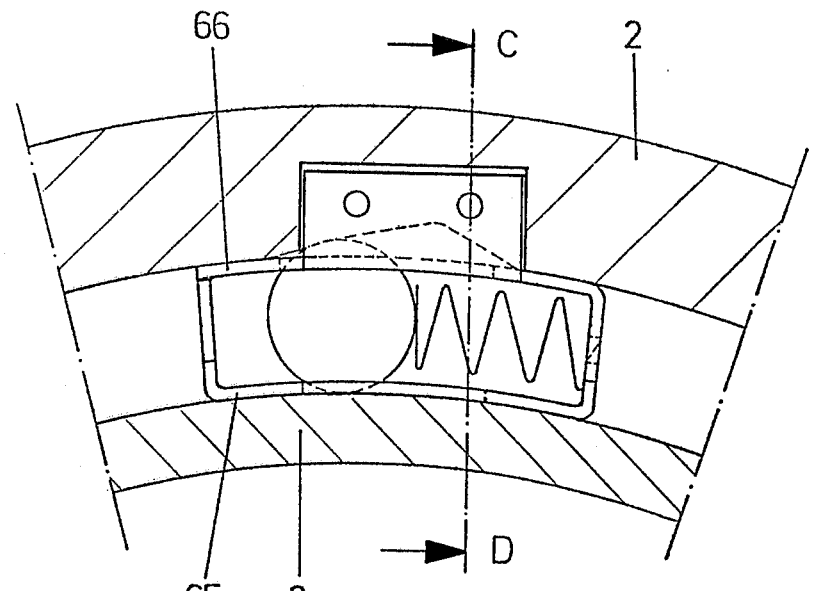
FIG. 10 shows an additional embodiment of segmental cage member.
Figure 11:
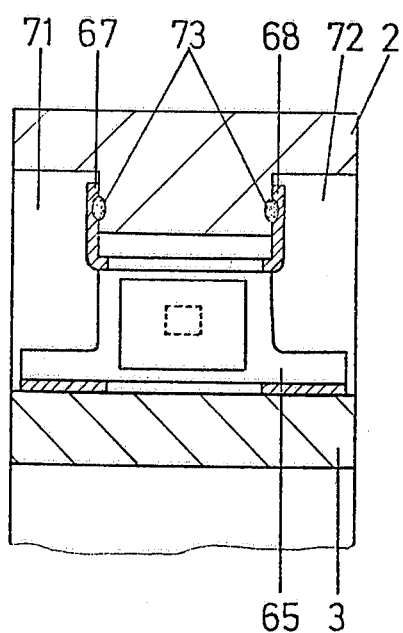
FIG. 11 shows a section view taken along the line C–D of FIG. 10.
Figure 12:
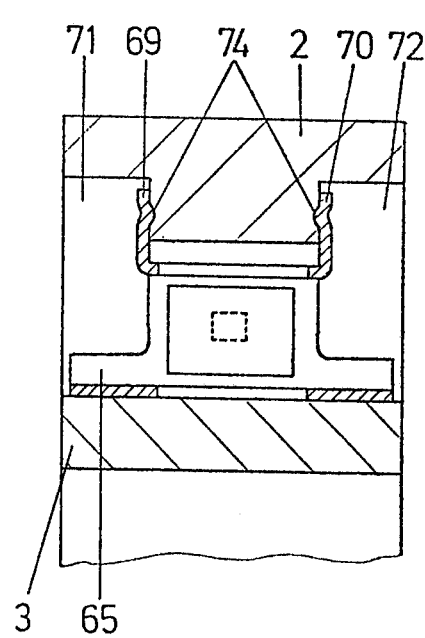
FIG. 12 is similar to FIG. 11 but shows a modified form of connection to the outer race member of the clutch.

The segmental cage member 65 shown in FIGS. 10 – 12 is similar to the cage member shown in FIGS. 5 – 7 except that outer part 66 is not formed as a profiled portion for engaging a wedging surface. The outer part 66 has two wall portions 67, 68 or 69, 70 extending outwardly which are inserted in recesses 71, 72, of race ring 2. Connection can be made by spot welding 73 or by means of projections 74 engaged in corresponding depressions in race ring 2.

Figure 13:
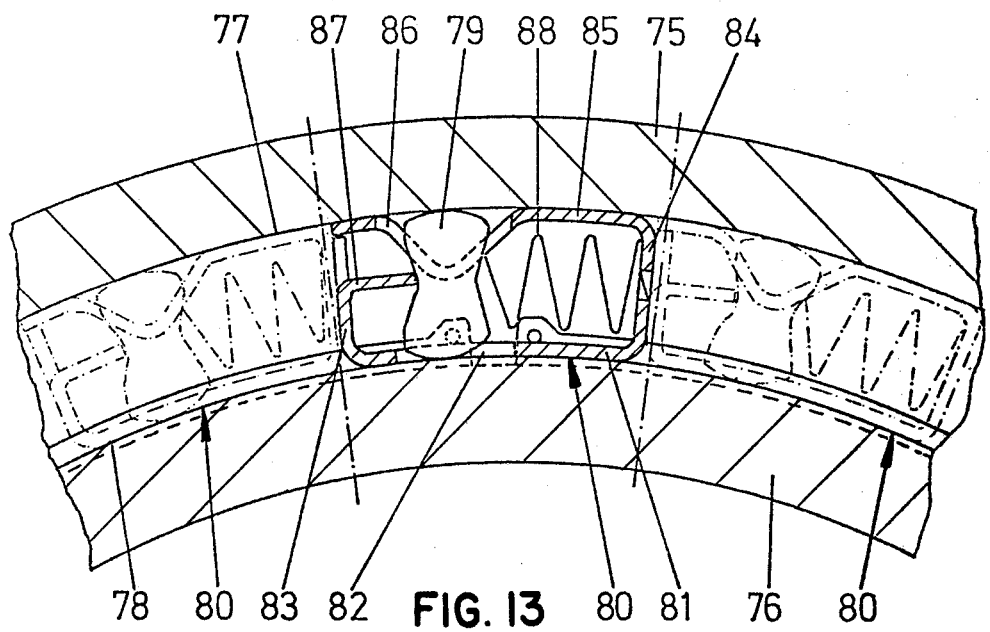
FIG. 13 is a fragmentary view of a form of the invention for use with sprag type free-wheel clutches.
Figure 14:
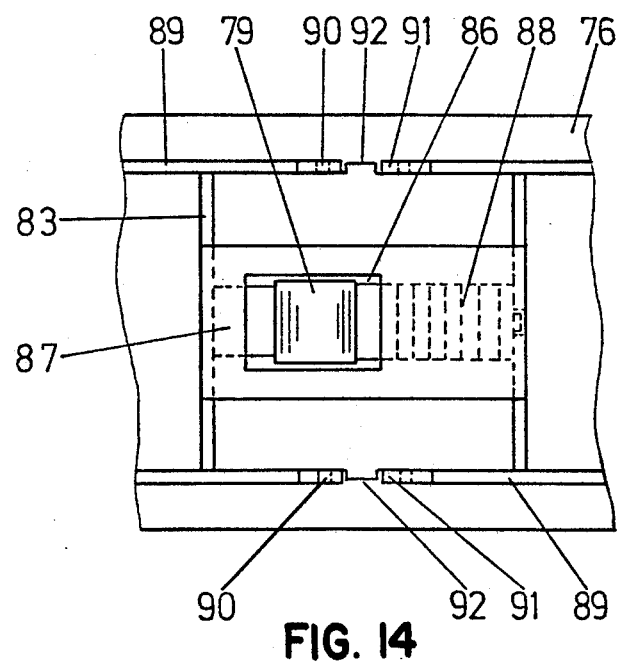
FIG. 14 is a top view of the segmental cage member shown in FIG. 13.

FIG. 13 is a fragmentary view of a free-wheel clutch in which clutch members 75 and 76 include race rings having cylindrical surfaces 77 and 78. The gripper elements are sprags 79 with non-cylindrical cross sectional profiles. The individual segmental cage members 80 are not held securely on the race rings 75, 76. These segmental cage members 80 have a base portion 81 with an opening 82, support portions 83, 84 and an outer portion 85 with an opening 86. The outer portion 85 is bend inwardly in the region of the opening 86 so that the edges of the opening 86 provide guides for sprags 79 in a manner similar to the embodiment shown in FIGS. 5 – 7. A middle portion 87 of support portion 83 serves to support sprag 79 on the side opposite spring 88. The individual cage segments are secured against lateral displacement by retaining rings 89, 89 which engage with grooves in race ring 76. The segmental cage member shown in solid lines in the drawing includes lugs 92 which project between the ends 90, 91 of the retaining rings. The group of segmental cage members 80 (shown in solid line and broken line) are thus connected to race ring 76 by means of retainer rings 89.

Figure 15:
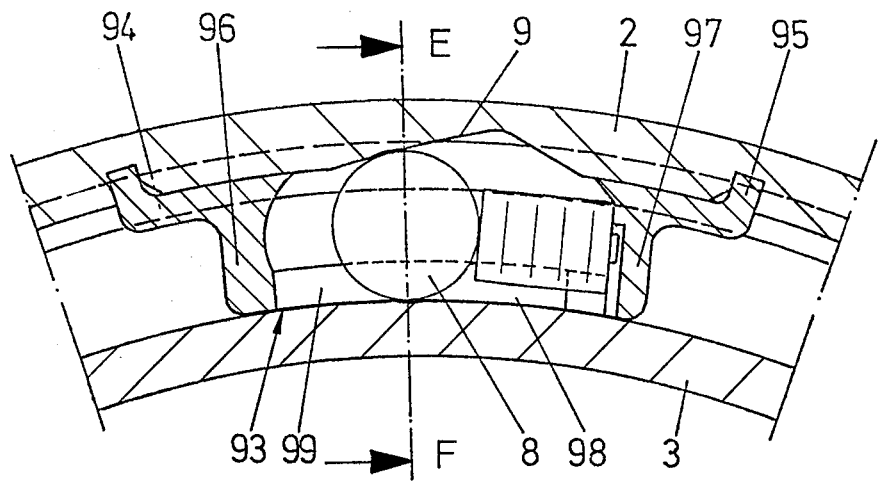
FIG. 15 is a fragmentary view of a segmental cage member formed of blocky material.
Figure 16:
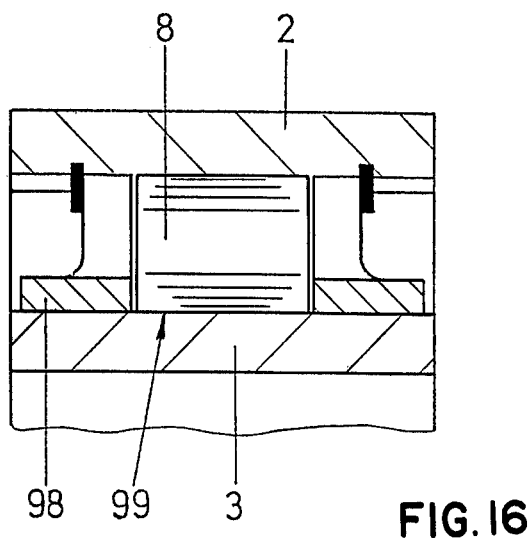
FIG. 16 is a section view taken along the line E–F of FIG. 15.

FIGS. 15 and 16 show a segmental cage member 93 which represents a so called "blocky" cage. This blocky cage is not stamped and bent from sheet metal, but is injection molded from suitable synthetic materials. This segmental cage member is similar to the embodiment shown in FIG. 9. Two end portions 94 and 95 engage in grooves in race ring 2 and thus stabilize the position of cage member 93. These ends 94 and 95 merge into support portions 96 and 97 which merge into base portion 98 having the opening 99. The base portion 98 provides lateral guides for grip roller 8.

What is claimed is:

1. A free-wheel clutch including an outer member and an inner member having gripper elements disposed between said outer and inner members and having springs engaging said gripper elements urging said gripper elements toward engagement with said outer and inner members characterized in that a gripper element (6) and its associated spring (10) are disposed within a segmental cage member (7, 29, 43, 56, 65, 80,), said segmental cage member being formed from a sheet metal blank, a group of said cage members being circumferentially disposed within said clutch (1).

2. A free-wheel clutch according to claim 1, characterized in that said outer member (2) and said inner member (3) are in the form of annular rings, one of said rings having a cylindrical surface (11) and the other having beveled clamping surfaces (9), said gripper element (6) being in the form of a cylindrical gripper roller (8).

3. A free-wheel clutch according to claim 1, characterized in that said outer member (75) and said inner member (76) are in the form of annular rings, each of said rings having a cylindrical surface (77, 78), said gripper elements being in the form of sprags (79) having a noncylindrical profile.

4. A free-wheel clutch according to claim 1, characterized in that each segmental cage member (7) includes a base portion (14) having a bearing surface thereon engaging one of said clutch members (3), said base portion including at least one opening (15) receiving a gripper element (6) and having at least one support portion (16, 17) engaging the other of said clutch members (2).

5. A free-wheel clutch according to claim 4, characterized in that said support portion (16, 17) of said segmental cage member (7) engages the clutch member (2) having beveled clamping surfaces (9) defined therein.

6. A free-wheel clutch according to claim 5, characterized in that a said segmental cage member (7) is secured in a position fixed with respect to said clutch member (2).

7. A free-wheel clutch according to claim 6, characterized in that a support portion (32, 33) is connected to a profiled portion (37) spaced from said base portion (30), said profiled portion including a surface coordinated with a race surface of one of said clutch members (2), said profiled portion including an opening (38) corresponding with an opening (31) in said base portion (30).

8. A free-wheel clutch according to claim 4, characterized in that a support portion (83, 84) is connected to an outer portion (85) forming a bearing surface.

9. A free-wheel clutch according to claim 8, characterized in that said outer portion (85) includes an opening (86) corresponding with an opening (86) in base portion (81).

10. A free-wheel clutch including an outer member and an inner member having gripper elements disposed between said outer and inner members and having springs engaging said gripper elements urging said gripper elements toward engagement with said outer and inner members characterized in that a gripper element (6) and its associated spring (10) are disposed within a segmental cage member (7, 29, 43, 56, 65, 80, 93), said segmental cage member including bearing material on selected surfaces thereof engaging cylindrical surface portions (11, 77, 78) of clutch members (3, 75, 76), a group of said cage members being circumferentially disposed within said clutch (1).

11. A free-wheel clutch according to claim 10, characterized in that said bearing material is formed of a non-ferrous metal.

12. A free-wheel clutch according to claim 10, characterized in that said bearing material is formed of nitrated steel.

13. A free-wheel clutch including an outer member and an inner member having gripper elements disposed between said outer and inner members and having springs engaging said gripper elements urging said gripper elements toward engagement with said outer and inner members characterized in that a gripper element (6) and its associated spring (10) are disposed within a segmental cage member (7, 29, 43, 56, 65, 80, 93), said segmental cage member including guide means for said gripper element and said spring, a group of said cage members being circumferentially disposed within said clutch (1).

14. A free-wheel clutch according to claim 13, characterized in that said guide means includes laterally disposed indented portions (39) extending from an outer portion (85, 37) of said segmental cage member.

15. A free-wheel clutch including an outer member and an inner member having gripper elements disposed between said outer and inner members and having springs engaging said gripper elements urging said gripper elements toward engagement with said outer and inner members characterized in that a gripper element (6) and its associated spring (10) are disposed within a segmental cage member (7, 29, 43, 56, 65, 80, 93), a group of said cage members being circumferentially disposed within said clutch (1), one of said segmental cage members (80) being connected to one of said clutch members (76) by means of a retaining ring (89).

* * * * *